June 13, 1961 N. L. JEGLUM ET AL 2,988,415

MACHINE SYSTEM RECORDER

Filed March 25, 1958 2 Sheets-Sheet 1

INVENTORS
Norman L. Jeglum +
Harold P. Reiling
BY
Ernest J. Hy
ATTORNEY

June 13, 1961   N. L. JEGLUM ET AL   2,988,415
MACHINE SYSTEM RECORDER

Filed March 25, 1958   2 Sheets-Sheet 2

INVENTORS
Norman L. Jeglum &
Harold P. Reiling
BY
Ernest J. H[y]
ATTORNEY

United States Patent Office 2,988,415
Patented June 13, 1961

2,988,415
MACHINE SYSTEM RECORDER
Norman L. Jeglum, Knollwood, and Harold P. Reiling, Brookville, Ohio, assignors to The Sheffield Corporation, Dayton, Ohio, a corporation of Delaware
Filed Mar. 25, 1958, Ser. No. 723,681
4 Claims. (Cl. 346—33)

This invention relates to recording systems and more particularly to systems and recorders for recording the timed inter-relationship and duration of events.

It is an object of this invention to provide a system and recorder for recording the timed inter-relationship and duration of periods of energization and deenergization of electric signal sources such as switches, relays and the like in a machine control circuit, the system and recorder having features of circuitry and construction for accuracy, clarity, and reliability of operation.

It is a further object to provide a recording circuit including an electrically actuated recording head connectable for energization with an alternating current signal source such as a switch, relay or solenoid in a control circuit or the like, unidirectional current control means being included in the circuit for the recording head for operation thereof at the frequency of the control circuit, thus providing clearly separated and distinct record markings of predetermined time spacing during energization of the signal source.

It is a further object to provide such a system and recorder including a plurality of recording heads, each connected or connectable in parallel to switch controlled signal sources in an alternating current machine control circuit or the like by means of an independent and a common lead to each head, similarly phased unidirectional current control means being provided in series with each recording head and a controlling switch being placed in said common lead whereby operation of a plurality of heads is controlled by a single pair of switch contacts and the possibility of feedback or stray signals in the control circuit is avoided.

It is a further object to provide a recorder for recording in a plurality of closely spaced parallel channels along a pressure sensitive strip by means of stylus elements each carried by a separate leaf prong formed integrally as part of a common leaf strip, whereby the stylii are simply supported in a rugged and friction-free manner and channel spacing as well as stylus alignment is precisely maintained.

Figure 1:
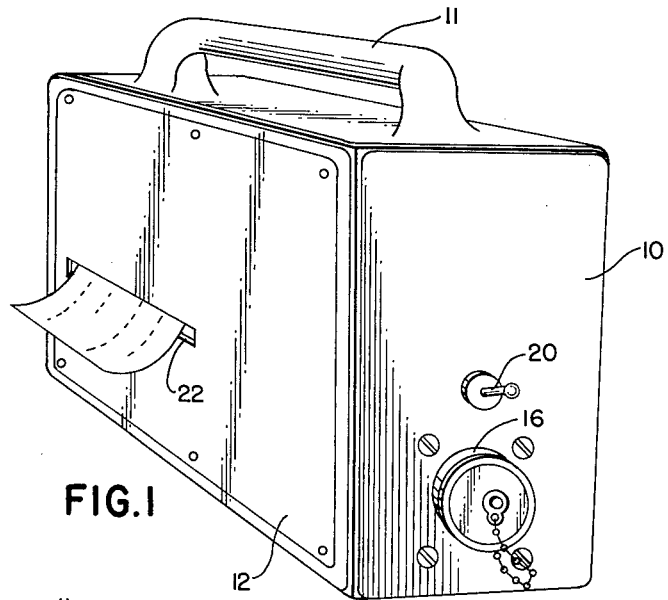
Figure 3:
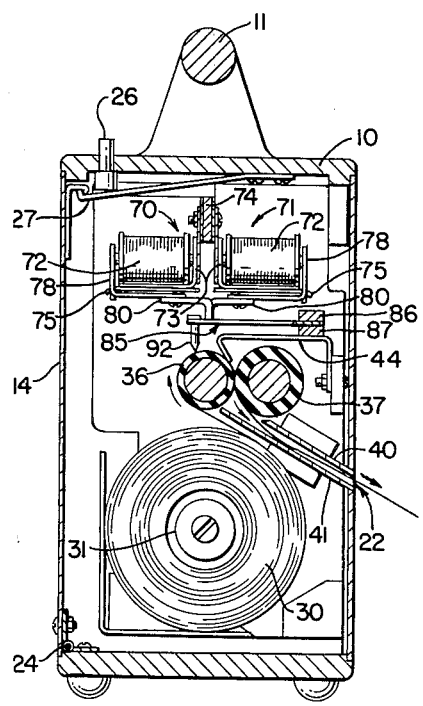
Figure 4:
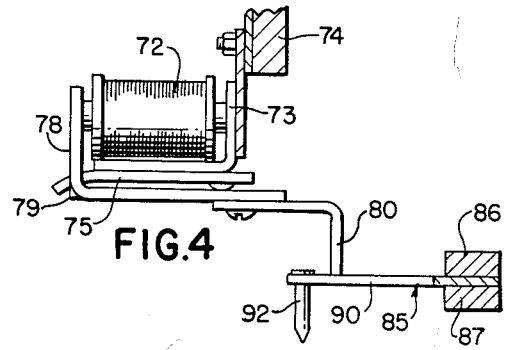
Figures 5, 6:
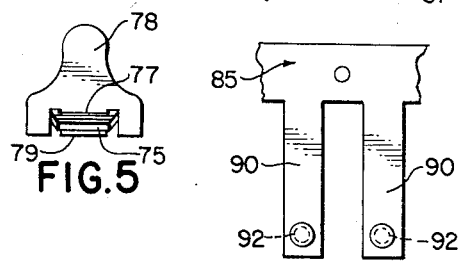
Figure 2:
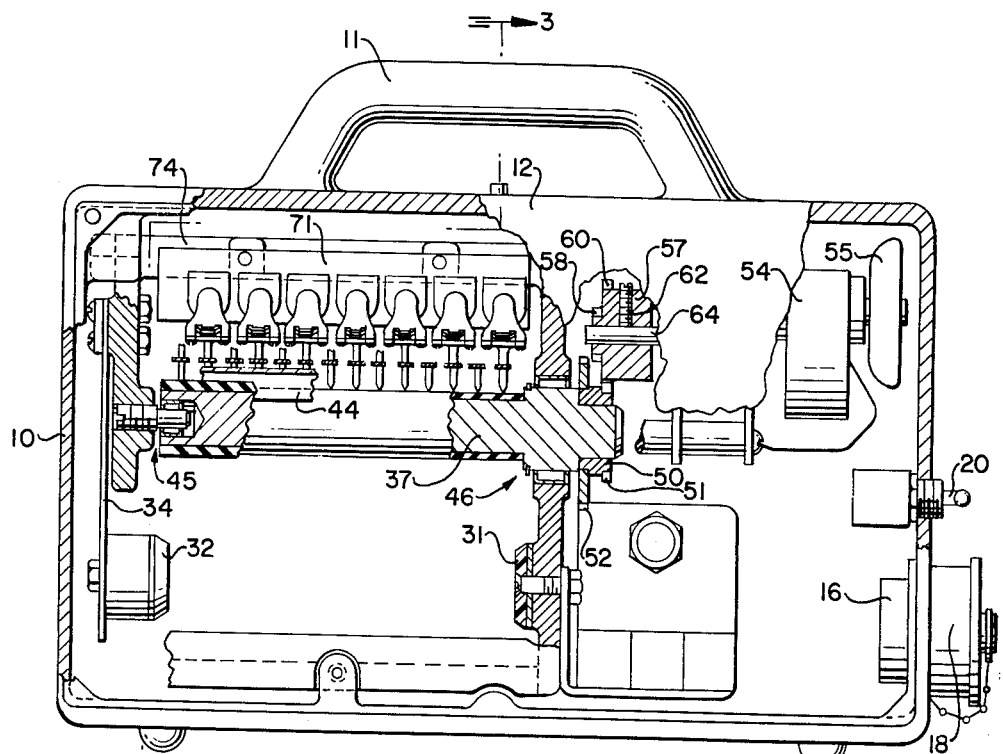
Figure 7:
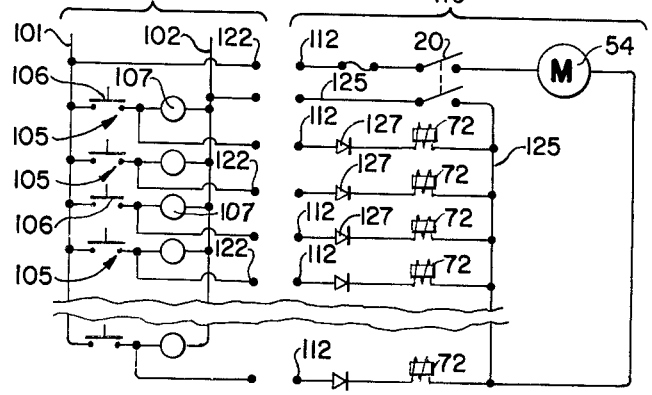
Figure 8:
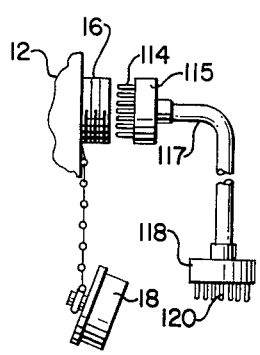

Other objects and advantages of the invention will be apparent from the following description, the appended claims, and the accompanying drawings, in which, FIGURE 1 illustrates, in perspective, a recording instrument having features of the present invention, FIGURE 2 is a front view of the instrument of FIGURE 1, partially broken away to central vertical section, FIGURE 3 is a sectional view taken on line 3—3 of FIGURE 2, FIGURE 4 illustrates one of the recording heads and associated structure involved in the recording operation, FIGURE 5 illustrates a detail of FIGURE 4, FIGURE 6 is a fragmentary illustration of a portion of the leaf strip supporting structure for the recording stylii, FIGURE 7 diagrammatically illustrates an exemplary machine control and recording circuit including features of the present invention, and FIGURE 8 illustrates an interconnecting conduit.

The present invention provides a recorder and recording system which is particularly useful for recording operations of machine tools and the like to determine whether the optimum time cycle is being accomplished. This recording operation is performed by recording the energization and deenergization periods of selected signal sources such as switches, relays, solenoids, timers and the like in the controlling circuit for the machine.

These signal sources are commonly provided in an alternating current signal circuit in parallel relationship between the "hot" and "common" sides thereof and are energized and deenergized in predetermined timed relation with the mechanical actuations and operations of the machine. Thus recording the functions of these sources provides a chart of the operating cycle of the machine itself.

In the exemplary embodiment illustrated a recorder is provided which has a plurality of recording heads with solenoids and stylii impacted thereby against a pressure sensitive record strip in recording channels along the strip. Each of the actuating solenoids is placed in parallel with a selected signal source by connections including a common lead to all solenoids from the common side of the control circuit.

Unidirectional, similarly phased, current control means are provided in series with each solenoid. Thus clear and distinct markings are provided along the pressure sensitive strip of a predetermined timed spacing at the frequency of the machine control circuit. This also makes possible simultaneous enabling and disabling of all recording solenoids by only a single pair of switch contacts in the common lead and without the possibility of feedback or stray signals resulting in the control circuit due to the recording connections.

Referring more particularly to the drawings an exemplary recorder is shown having a housing 10 with an integrally formed carrying handle 11. Because the present recorder and system are especially provided for timing machine control circuits the mechanism thereof is completely enclosed through cooperation of housing 10 with front and rear cover plates 12 and 14. Housing 10 encloses a plurality of electrically actuated recording heads and drive means for feeding a pressure sensitive record strip relative thereto for recording in a plurality of channels. A multiple socket receptacle 16 is provided on one side of housing 10 having leads to the operating components of the recorder. Threaded cover plate 18 is placed over receptacle 16 when the unit is not being utilized for recording. Toggle switch 20 controls the operation of the recorder.

Front plate 12 has a slot 22 through which the record strip is fed during operation of the recorder. Rear plate 14 is hinged to housing 10 at 24. Push button 26 releases a spring lock 27 so that plate 14 can be opened, rendering the entire interior of housing 10 accessible for maintenance and for loading the recorder with paper rolls.

A roll 30 providing a strip of pressure sensitive recording paper is mounted in the recorder by placing one end of its supporting core over a projection 31 and resiliently engaging the other end of the core with a similar projection 32 carried by spring leaf 34 (see FIGURE 2). As seen in FIGURE 3 the driving mechanism of the recorder includes a pair of cooperating rollers 36 and 37 having resilient surfaces. The strip is fed up and over roller 36, down between the rollers, through guiding plates 40 and 41, and out opening 22. Paper guide 44 aids in threading the paper into the recorder. Roller 37, the driven roller of the pair, is supported within housing 10 by bearings indicated at 45 and 46. Roller 37 has a drive gear 50 fixed to its right hand end as seen in FIGURE 2. Drive gear 50 includes gears 51 and 52 of respectively greater diameter. Electric motor 54 mounted in housing 10 is cooled by fan 55 and drives, through a conventional reduction gear assembly not shown, to a change gear 57. Change gear 57 has gears thereon of respectively greater diameter indicated at 58 and 60. Change gear 57 is fixed by set screw 62 on output shaft 64 driven by motor 54.

With change gear 57 in the position of FIGURE 2 a substantially 1–1 ratio drive is provided. However if a reduction is desired for another recording speed set screw 62 is released, change gear 57 slid to its left, and gears 58 and 52 placed in mesh to achieve the other ratio. Thus a positive and precise feeding drive for the record strip is provided but with selective speeds for universal application under different recording circumstances.

A plurality of recording heads are supported in the upper portion of housing 10 just above rollers 36 and 37 in a pair of opposed parallel banks 70 and 71. Each recording head includes a solenoid 72 mounted by an L-shaped bracket 73 from a carrying bar 74. See particularly FIGURES 4 and 5 which illustrate a recording head of the left hand bank 70. A spring arm 75 fixed at its right hand end to bracket 73 has a tapered left-hand end as seen in FIGURE 4 including a transverse slot 77. Lever 78 actuated by the core of solenoid 72 has a prong 79 projecting through slot 77 in spring arm 75. The lower portion of lever 78 extending closely along beneath arm 75 supports an actuator 80. Thus lever 78 is detachably carried for pivoting movement by arm 75.

The recording heads of bank 70 and 71 are carried in overlapping relationship and actuators 80 from each bank extend alternately to a common line extending transverse the record strip parallel to the axis of roller 36. This makes possible an extremely compact arrangement of actuators 80 for closely spaced recording channels.

A spring strip 85 of a length to extend fully along the banks of recording heads is clamped at its rear end between blocks 86 and 87. It has integrally formed prongs 90 extending therefrom in closely spaced parallel relationship, one prong for each of actuators 80 (see FIGURE 6). At the outer end of each of prongs 90 is carried a marking stylus 92.

The actuator 80 of each recording head cooperates between the respective solenoid 72 and the associated prong 90 to impact the corresponding stylus 92 against the record strip for marking upon each energization of said solenoid 72. The provision of spring strip 85 with its integrally formed stylus supporting prongs 90 insures that the recording channels are precisely relatively spaced across the strip in parallel channels. Also the provision of this stylus supporting structure insures that the stylii are carried in a straight line transverse the record strip so that a common reference is provided. Thus in a simple integral support precise spacing and alignment of the marking stylii is insured.

FIGURE 7 illustrates an exemplary circuit including features of this present invention. The portion 100 is basically that of a typical machine control circuit including "hot" lead 101 and a "ground" or "common" lead 102. Between these leads are connected parallel signal circuits, such as those indicated at 105, involved in controlling the sequential operation of the machine. These parallel signal circuits commonly include controlling switch means as indicated at 106 and signal sources 107 in series therewith at the common side.

The signal sources 107 can be relays, solenoids, timers or the like. Switches 106 are actuated by relays, timers, cams or other components of the machine or its controlling circuits. If desired a signal circuit including only a switch means 106, operated perhaps by a mechanical part of the machine, can be utilized to provide a signal source for a particular event in the operation of the machine. Upon actuation of the corresponding switch means 106 one of signal sources 107 will thus be energized. In view of the fact that these sources are energized and deenergized in timed relation to the machine operation recording of these periods will provide a precise presentation of the timed inter-relationships of machine operation. These are extremely important in rapidly operating equipment with complex operating cycles.

The portion of the circuit of FIGURE 7 indicated at 110 is that provided within the recorder itself. Receptacle 16 on housing 10 includes a plurality of sockets 112 for receiving prongs 114 of plug 115 at one end of a conduit 117 having a corresponding plug 118 at its other end (see FIGURE 8). Prongs 120 of plug 118 are for connection to sockets 122 of the machine control circuit 100. Thus with conduit 117 connected between machine circuit 100 and recording circuit 110 the respective leads are in the relationship as shown in FIGURE 7. Each recording solenoid 72 is connected in series with a switch means 106 and, in this example, in parallel relationship to one of the signal sources 107 of circuit 100 for energization therewith. The sockets 112 of receptacle 16 include a contact for each of solenoids 72 to be connected at one side of the respective signal source 107 between that source and its associated controlling switch 106. The other sides of the solenoids 72 are connected to a common lead 125 which is in turn connected to the common side of circuit 100.

Feed drive motor 54 is also connected across leads 101 and 102 of machine control circuit 100.

In view of the fact that control circuit 100 is energized by alternating current, each solenoid 72 will be periodically energized along with its respective signal source 107 to repeatedly impact the associated stylus 92 against the moving record strip and provide markings of a reference time spacing.

A controlling switch 20 is provided with contacts in the common lead to solenoids 72 and in the lead to motor 54. However, were switch 20 the only control provided it would be possible as long as the control and recording circuits are connected together that upon closure of a switch 106 "feedback" circuits would be completed from the respective circuit 105, through a solenoid 72 of recording circuit 110, and to another of the signal circuits 105. Thus a signal source 107 would be energized other than that of an effective closed switch 106. This would also mean that certain of solenoids 72 could be energized even though the contacts of switch 20 were open.

To eliminate such feedback circuits similarly phased unidirectional current control means such as rectifiers 127 are mounted in housing 10 and included in the solenoid circuits in series with solenoids 72. Thus it is impossible for a circuit to be completed through a solenoid 72 and back through another one of the solenoid circuits to energize one of the signal sources 107.

A first advantage resulting from the provision of rectifiers 127 in series with recording solenoids 72 is that the solenoids are energized at the frequency of control circuit 100. Without this arrangement with a 60 cycle control circuit for example, the markings through energization of the recording solenoids would be at double the control circuit frequency or at 120 markings per second. With the present invention the spaced dots marked upon the record strip by stylii 92 are much more clear and distinct as they have a relative time spacing at the frequency of the alternating control circuit (60 per second with a 60 cycle source). This provides a clear and readily interpreted time spacing recording in each of the channels of the recorder.

As a second advantage control of the entire recorder circuit including the plurality of recording solenoids 72 is made possible with a single contact set in the common lead 125 and with the possibility of "feedback" circuits being eliminated. The obvious complexity involved in accomplishing the same result with contacts in each of the solenoid circuits will be appreciated. This makes possible reliable control in an extremely simple circuit with advantages in recording clarity.

Thus it is seen that a recording system and apparatus have been provided with advantages for rapid and accurate recording with an easily interpreted presentation. Through the simple structure of the recorder precise parallel channels are provided with selective speed control in a compact and rugged arrangement. Through the unique controlling and recording circuit a great number of recording solenoids or the like can be disabled or enabled through a single contact and without the possibility of creating false signal errors in the control circuit of the machine. Clear and separately distinct time-spaced recordings are also made possible.

It is to be understood that this invention is not limited to the precise form illustrated but that changes may be made therein without departing from the scope of the invention which is defined in the appended claims.

What is claimed is:

1. Apparatus for recording the duration and relative timing of signals obtained in an electrical system such as an alternating current machine control system having a common side and parallel signal circuits each with a signal source and controlling switch means in series therewith, to record a cycle of rapidly occurring machine operations, said apparatus comprising a recording head for each of said signal sources, circuit means for each of said heads connectable in parallel to a respective one of said signal sources for joint energization of the signal source and recording head upon closing of the respective controlling switch means including a common lead for the recording heads connectable to the common side of the control system, the circuit means for each of said heads including a unidirectional current control means in series with the respective head, the current control means being similarly phased, and switch means in said common lead for simultaneous enabling and disabling of said heads.

2. Apparatus for recording the duration and relative timing of signals obtained in an electrical system such as a machine control system having a common side and parallel signal circuits each having electrical switch means therein, to record a cycle of rapidly occurring machine operations, said apparatus comprising a recording head for each of said circuits, circuit means for each of said heads connectable in series with a respective one of said switch means for energization of the recording head upon closing of the respective switch means, said circuit means including a common lead for the recording heads connectable to the common side of the control system, the circuit means for each of said heads including a unidirectional current control means in series with the respective head, the current control means being similarly phased, and switch means in said common lead for simultaneous enabling and disabling of said heads.

3. An apparatus for recording the duration and relative timing of signals obtained in an alternating current electrical system such as a machine control system having a common side and parallel signal circuits each with a signal source and controlling switch means in series, to record a cycle of rapidly occurring machine operations, said apparatus including a recording head for each of said signal sources, means for feeding a record strip during recording including an electric drive motor, each of said recording heads including electrical actuating means and a stylus operated thereby for application to the record strip during periods of energization, leads for connecting said motor across said control system, leads for connecting each of said heads in parallel to a respective one of said signal sources for joint energization therewith upon closing of the respective controlling switch means including a common lead for the recording heads connectable to the common side of the control system, unidirectional current control means in series with each of said heads in the respective parallel circuit, the current control means being similarly phased, and a single manually operated switch including contacts in both said common lead and one of the leads to said motor for simultaneous control of said motor and said recording heads.

4. A readily portable recording unit for recording the duration and relative timing of signals obtained in an alternating current electrical system such as a machine control system having a common side and parallel signal circuits each with a signal source and controlling switch means in series, to record the cycle of rapidly occurring machine operations, said unit comprising a housing, a recording head in said housing for each of said signal sources, means for continuous feed movement of a record strip during recording including an electric drive motor in said housing, each of said recording heads including a marking stylus and electrical actuating means connected to cyclically bring the respective stylus into engagement with the strip for marking dots therealong and yielding means for retracting the stylus to clear the strip between each cyclic engagement therewith, leads for connecting said motor across said control system, leads for connecting each of said heads in parallel to a respective one of said signal sources for joint energization therewith upon closing of the respective controlling switch means including a common lead for the recording heads connectable to the common side of the control system, a common receptacle mounted on said housing for simultaneous connection of said leads to the circuits of the alternating current electrical system of the machine, said receptacle including a plurality of contacts including a separate contact connected to the lead at one side of each of said electrical actuating means, a single contact connected to said common lead and contacts for said motor leads, unidirectional current control means in said housing in series with each of said heads in the respective parallel circuit, the current control means being similarly phased, and a single manually operated switch including contacts in both said common lead and one of the leads to said motor for simultaneous control of said motor and said recording heads.

References Cited in the file of this patent

UNITED STATES PATENTS

| | | |
|---|---|---|
| 203,689 | Wilson | May 14, 1878 |
| 845,637 | Hausburg | Feb. 26, 1907 |
| 1,519,473 | Zahm | Dec. 16, 1924 |
| 2,309,956 | Hughes | Feb. 2, 1943 |
| 2,325,451 | Wait | July 27, 1943 |
| 2,389,828 | Swift | Nov. 27, 1945 |
| 2,517,316 | Holmes | Aug. 1, 1950 |
| 2,628,277 | Spencer | Feb. 10, 1953 |
| 2,776,867 | Boyan | Jan. 8, 1957 |
| 2,858,182 | Chambers | Oct. 28, 1958 |

FOREIGN PATENTS

| | | |
|---|---|---|
| 1,267 | Great Britain | 1909 |
| 562,461 | Great Britain | July 3, 1944 |